May 27, 1952 F. BARON 2,597,968
MACHINE FOR DECORATING CHINA OR THE LIKE
Filed March 13, 1948 5 Sheets-Sheet 1
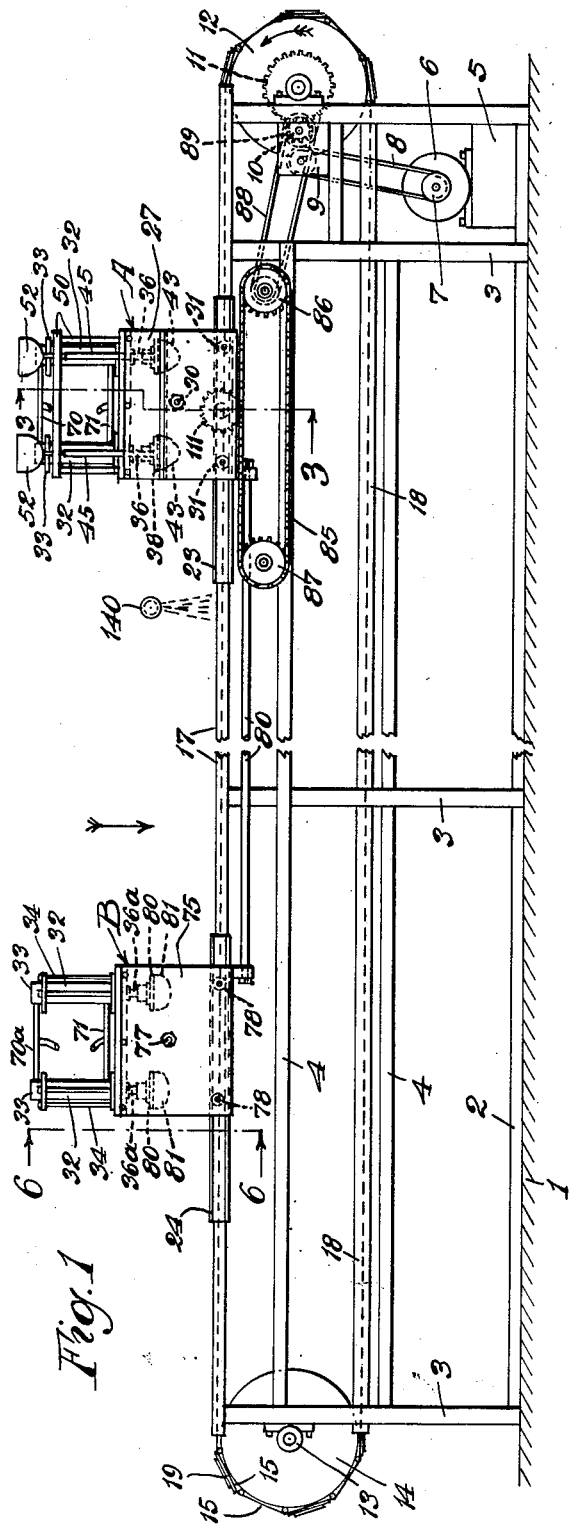
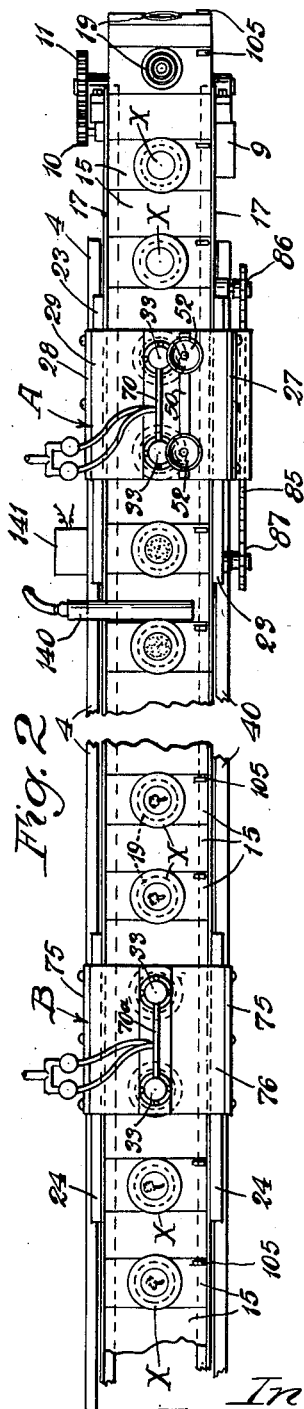
Inventor
Fred Baron
by Parker Carter
Attorneys

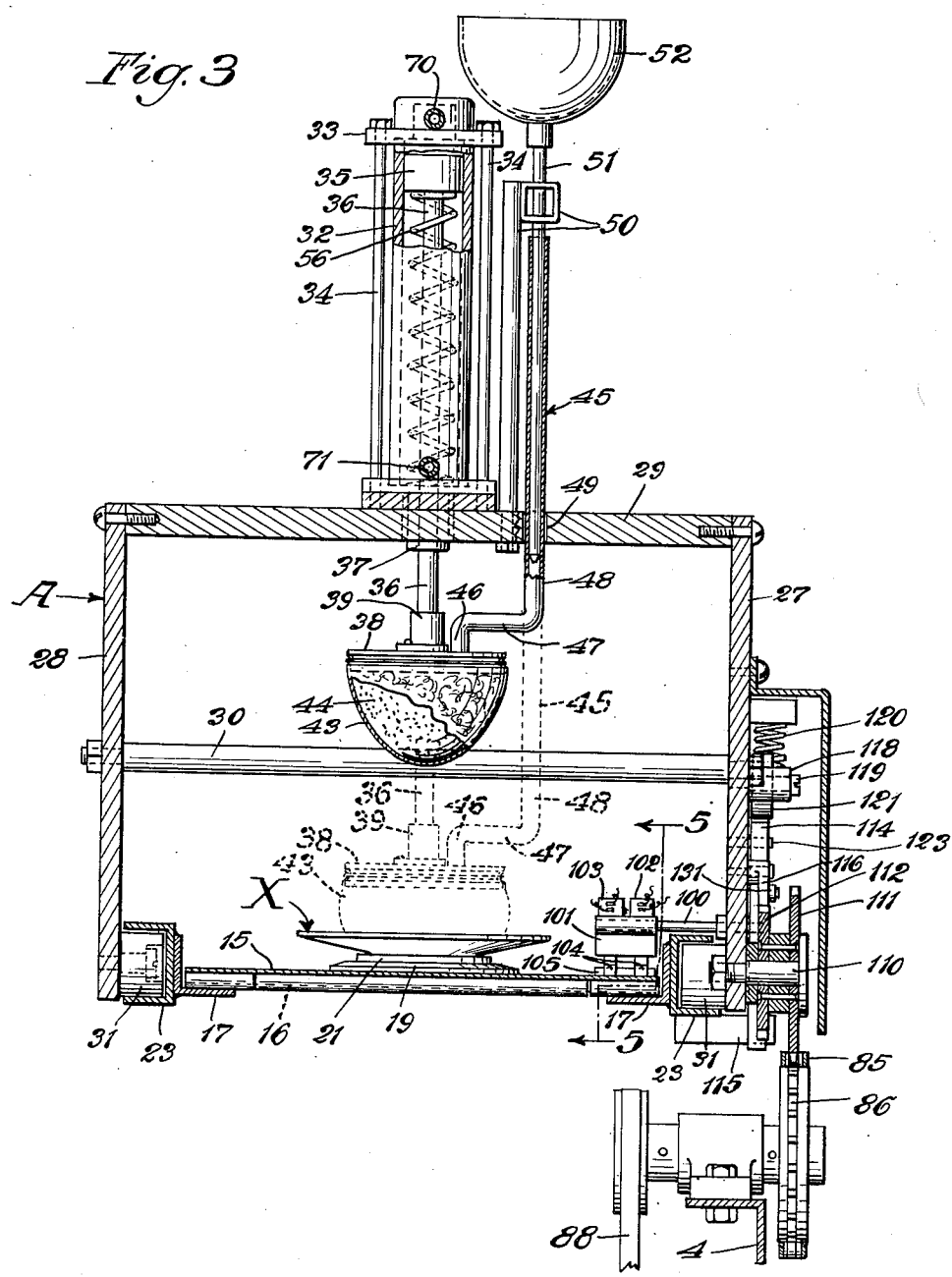

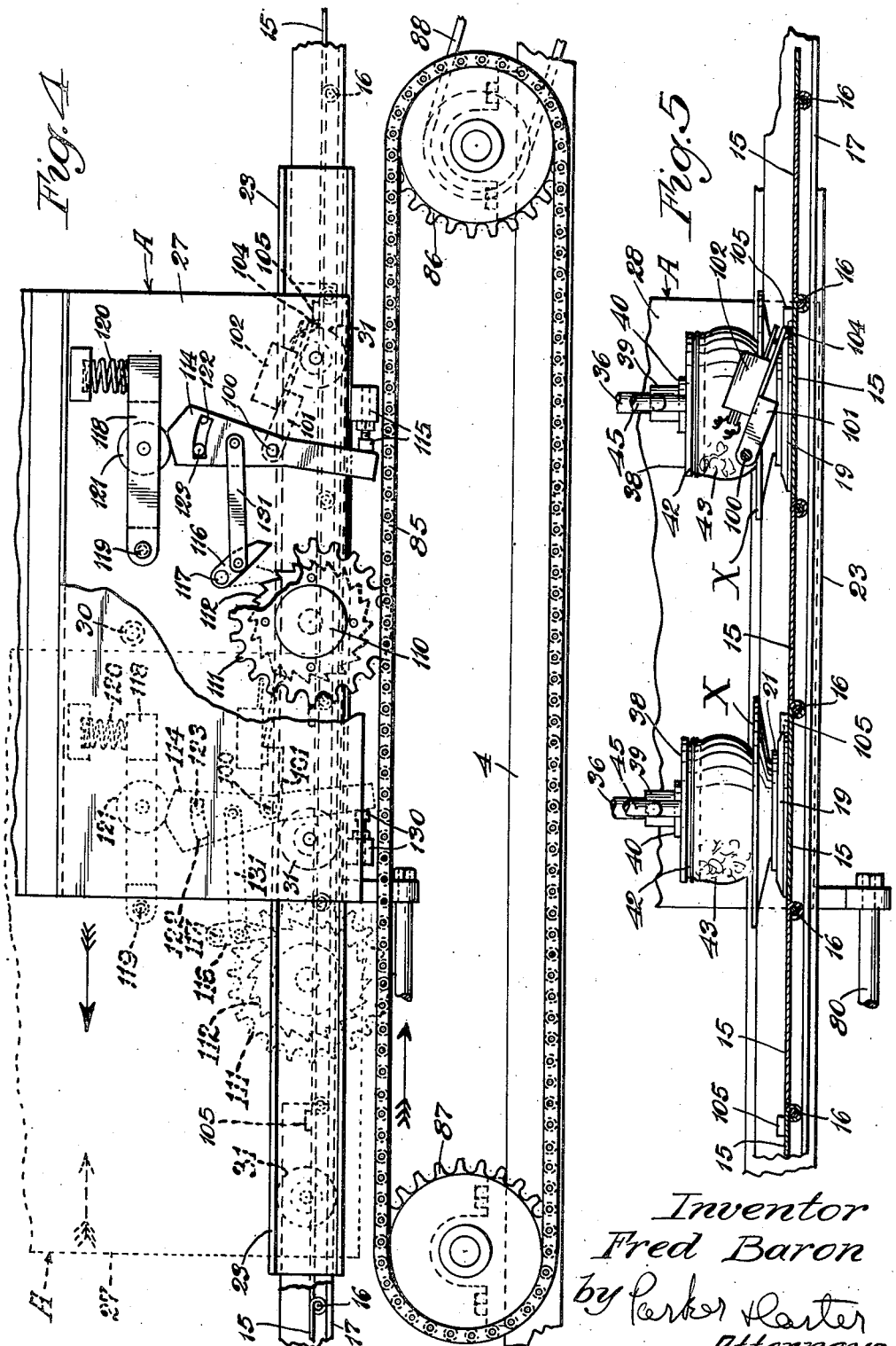

May 27, 1952 F. BARON 2,597,968
MACHINE FOR DECORATING CHINA OR THE LIKE
Filed March 13, 1948 5 Sheets-Sheet 4
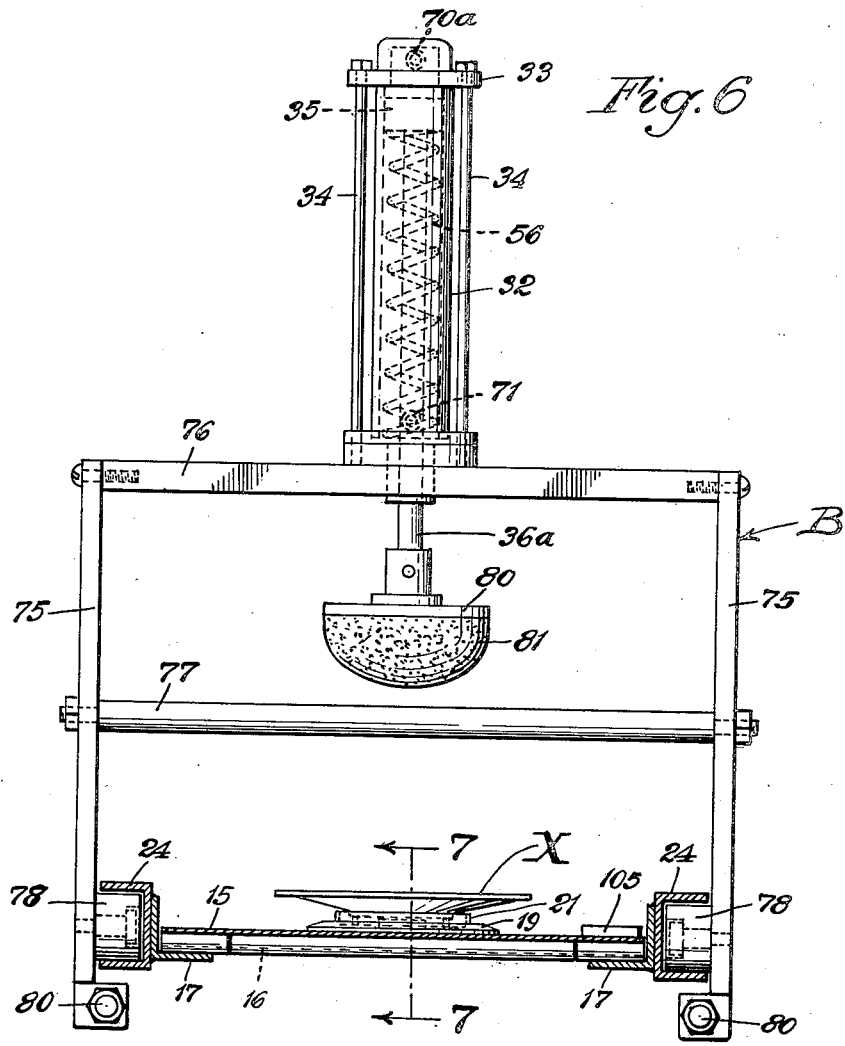
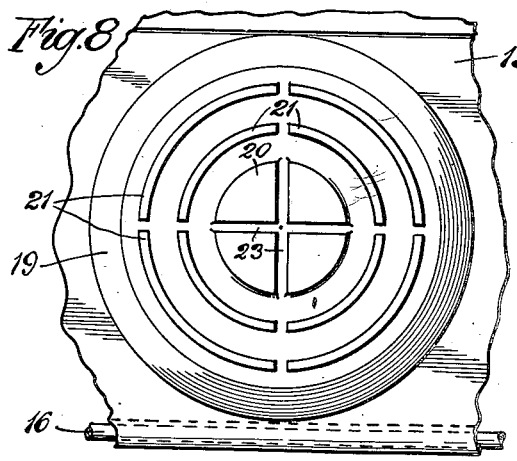
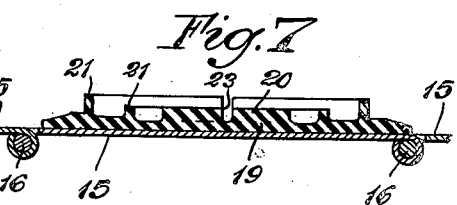
Inventor
Fred Baron
by Parker & Carter
Attorneys May 27, 1952     F. BARON     2,597,968
MACHINE FOR DECORATING CHINA OR THE LIKE
Filed March 13, 1948     5 Sheets-Sheet 5
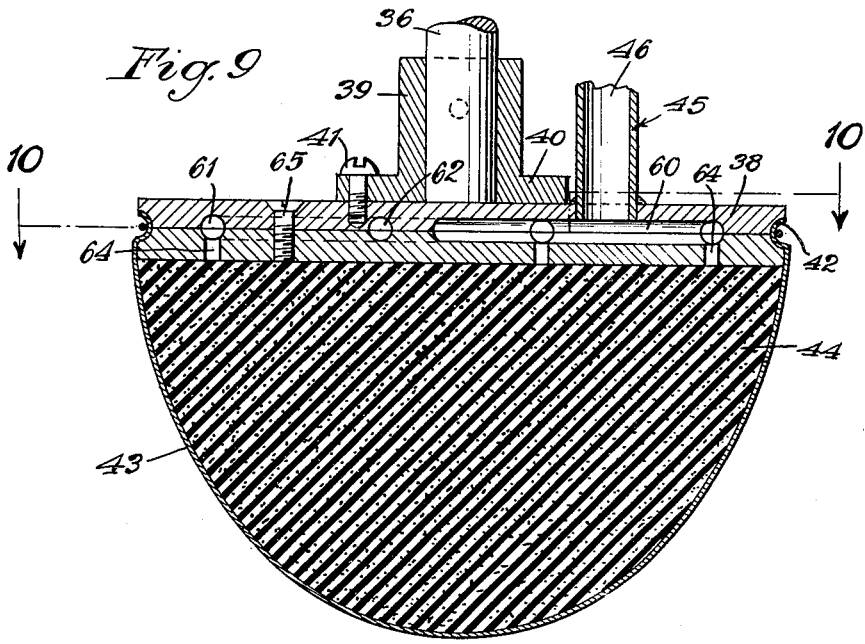
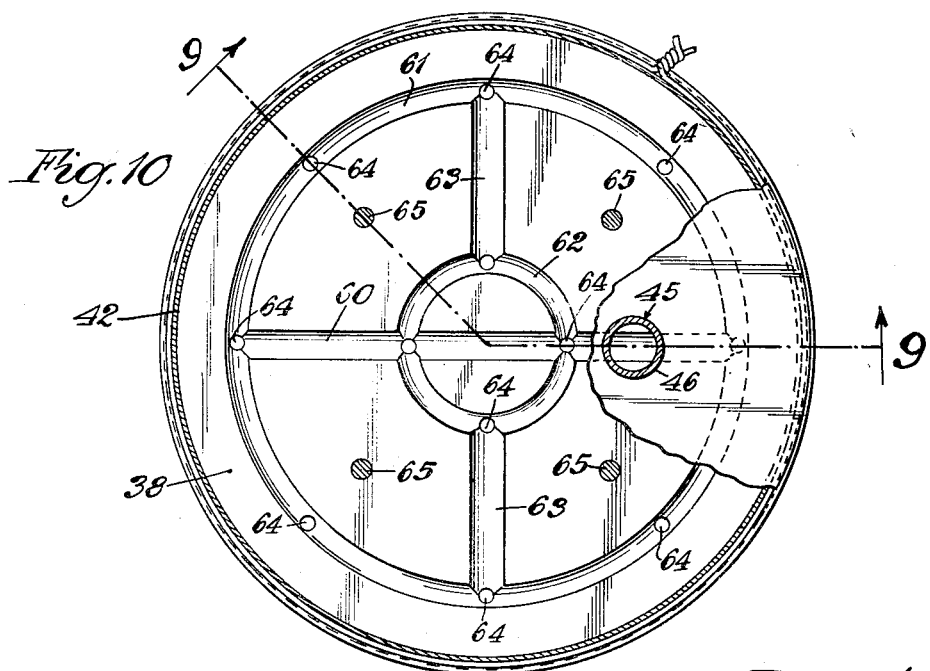
Inventor
Fred Baron
by Parker & Carter
Attorneys Patented May 27, 1952

2,597,968

UNITED STATES PATENT OFFICE 2,597,968

MACHINE FOR DECORATING CHINA
OR THE LIKE

Fred Baron, Chicago, Ill., assignor to Stetson China Company, Chicago, Ill., a corporation of Illinois Application March 13, 1948, Serial No. 14,743

11 Claims. (Cl. 118—239)

My invention relates to an improvement in mechanisms for marking or decorating china or the like.

One purpose is to provide a device, substantially automatic in its operation, for decorating china plates, containers and the like.

Another purpose is to provide an improved conveying and stamping mechanism for china and the like.

Another purpose is to provide an improved china stamping or marking assembly in which the china is moved progressively through a plurality of treating zones.

Another purpose is to provide an improved conveyor for use in handling china.

Another purpose is to provide improved marking or impressing means for china and the like.

Another purpose is to provide improved means for positioning the articles to be treated as they pass through the zone or zones of treatment.

Another purpose is to provide improved supporting and centering means for the articles being treated.

Other purposes will appear from time to time in the course of the specification and claims.

I illustrate my invention more or less diagrammatically in the accompanying drawings wherein:

Fig. 1 is a side elevation of my invention with parts broken away.

Fig. 2 is a plan view of the structure shown in Fig. 1.

Fig. 3 is a section on an enlarged scale on the line 3—3 of Fig. 1.

Fig. 4 is a side elevation on an enlarged scale, with parts broken away, of part of the structure shown in Fig. 1.

Fig. 5 is a section on the line 5—5 of Fig. 3.

Fig. 6 is a section on an enlarged scale on the line 6—6 of Fig. 1.

Fig. 7 is a section on an enlarged scale on the line 7—7 of Fig. 6.

Fig. 8 is a plan view of the structure shown in Fig. 7.

Fig. 9 is a section on the line 9—9 of Fig. 10; and

Fig. 10 is a section on the line 10—10 of Fig. 9.

All numbers indicate and refer to like parts throughout the specification and drawings.

Referring to the drawings, and particularly to Figs. 1 and 2, 1 indicates any suitable supporting surface, such as a factory floor. 2 indicates any suitable base from which extend uprights 3 which, with the base 2 and other structural elements, including the horizontal elements 4, constitutes a machine framework on which the below described structure is suitably supported. 5 is any suitable member support, upon which is mounted the motor generally indicated as 6, with its drive pulley 7 driving any suitable belt 8. 9 generally indicates a suitable gear reduction which through the pinion 10 rotates the gear 11 in response to rotation of the motor pulley 7. Driven by the gear 11 is any suitable sprocket or belt engaging member 12. Journalled as at 13, at the opposite end of the framework, is the idler 14 over which the opposite end of the belt passes.

Any suitable belt may be employed, but I prefer to employ, as shown herein, a belt formed of a plurality of sections or plates, of metal or the like, pivoted to each other. The individual plates, indicated for example at 15, may all be identical if desired, and may be pivoted to each other by any suitable pivotal connection 16. The upper stretch of the belt, as shown for example in Figs. 1 and 6, rests upon tracks 17, in the form of angles. The tracks 17 may be suitably mounted upon the above described framework, the details of their support being unnecessary to indicate. If desired, similar supporting tracks 18 may be provided for a lower stretch of the belt. The belt does not form part of the invention.

I find it advantageous to drive the belt continuously, from the motor 6 through the gear reduction 9, at any suitable speed or range of speeds. Every second plate or belt element 15 is shown as provided with a work abutment or centering device generally indicated as 19. They may be made of rubber or a suitable rubber substitute or material and are secured in any suitable manner to the upper surface of every alternate plate 15. It will be understood that if desired, they may be mounted for ready assembly or adjustment, but under some circumstances it may be advantageous to cement them permanently in place where the same assembly is going to be used for the same size or range of sizes of china for a prolonged period. The element 19 may have a central support 20 and two or more concentric centering rings 21 of different diameters. Suction is prevented and centering is made more evident to the eye, by generally radial cuts or depressions 23, as shown for example in Fig. 8.

For convenience and understanding the mechanism, it will be understood that the following functions are performed:

(a) The work, after having been centered on the supports 19, is subjected to a layer of glue.

(b) This glue is partially dried by an air spray or the like.

(c) A pattern applying member, or pattern material, such as a decalcomania or gold leaf or other suitable material, is positioned upon the glued upper surface of the china.

(d) Pressure is applied in order to cause the pattern forming material to be bonded to and held by the glue on the upper surface of the articles being treated.

In order to carry out the above steps, I provide a plurality of movable working heads. To support these working heads, I provide outwardly channeled tracks 23 for the workhead or sub-frame nearest the feed end of the belt, and similar tracks 24 for the other working head or sub-frame. It will be understood that each sub-frame or head is longitudinally movable, along the belt, for a substantial distance but that, as shown, for example, in Figs. 1 and 2, the sub-frames generally indicated as A and B are longitudinally spaced along the belt and along its supporting framework.

The function of the first framework or work head A is to apply a glue or suitable liquid or adhesive to the upper surface of the articles to be treated. With reference for example to Fig. 3, I illustrate a piece of china X as mounted and centered on one of the members 19. It will be understood that the mounting or centering may be manually done upon the initial feed end of the belt, to the right of the sub-frame A as shown in the position of Figs. 1 and 2. The operator will find it easy to center the china piece, as preferably, the member 19 will be formed to receive and center the bottom flange or foot of the plate X. As the plate passes along the belt it moves beneath the sub-frame A. The sub-frame A may include any suitable side members 27, 28 the top member 29 and one or more intermediate spacing bolts or spacing elements 30. The side members 27, 28 carry track engaging rollers 31 which enter and ride in the track channels 23. Mounted on the top member or plate 29 is a pair of thrust cylinders 32. Each cylinder may be secured to the top plate 29, as by any suitable top member 33 and securing bolts 34. Within the cylinder is a piston 35 and a piston rod 36 which extends downwardly through any suitable bearing block 37. The piston rod 36 carries at its lower end a plate 38 which may be secured to the rod 36 by any suitable fitting 39 with its bottom flange 40 and securing screws 41. The plate 38 is shown as having a circumferential channel 42 adapted to receive the edges of a pervious cover 43, of readily flexible material such as chamois which surrounds a suitable body 44 of sponge rubber or the like. Any suitable liquid may be supplied to the sponge rubber through the supply duct 45 which extends upwardly as at 46 laterally as at 47 and again upwardly as at 48. The portion 48 extends upwardly through a suitable aperture 49 in the plate 29. It will be understood that the supply duct may, in unison with the piston 35 and the rod 36, move up and down in relation to the plate 29. The uppermost position is shown in full line in Fig. 3 and the lower position is shown in dotted line in Fig. 3. A supporting bracket 50 is shown which supports an upper feed duct 51 shown as in telescopic relationship with the feed duct portion 48. If desired, the upper duct 51 and any suitable supply container 52 may normally be held against movement, the length of telescopic relationship being sufficient to maintain a constant feeding connection. It will also be understood that suitable means, such as the spring 56, may be employed to maintain the piston 35 normally in the upwardly withdrawn position in which it is shown in Fig. 3. Liquid from the duct 45 may be supplied to the sponge rubber body 44 through any suitable duct system. I illustrate, for example, a diametrically extending duct 60 within the plate 38, which communicates with an outer circumferential duct 61 and an inner circumferential duct 62. I may also provide additional radial ducts 63 which connect the two circumferential ducts. In the duct system I provide a plurality of outlet passages or ducts 64 in the plate 38. For convenience the plate 38 may be formed of two separate members which are thereafter secured together by any suitable securing screws 65. It will be understood that, by use of means below described, the carriage or sub-frame A moves in unison with the belt for a limited period, during which period fluid under pressure is admitted to the upper ends of the cylinders 32, for example, along ducts 70. The result is to move the pistons downwardly and to thrust the sponge rubber 44 against the china X, as shown in dotted line in Fig. 3. For convenience, I employ two pistons on the sub-frame A, so that two plates are simultaneously treated. When contact has been maintained long enough, the members 43, 44 are upwardly withdrawn. It will be understood that any suitable valve system may be employed and since the details of valving and of application of pressure to the pistons 35 do not of themselves form part of the present application, they are not herein shown in detail. It will be understood that any suitable regulatory outlet 71 may be provided, as shown in Fig. 3, toward the bottom of each cylinder 34. After the members 43, 44 have been upwardly withdrawn, following the treatment of two of the members X, the forward movement of the sub-frame A terminates by means which will be below described, and the sub-frame A returns to the right, referring to the position in which the parts are shown in Figs. 1 and 2, and is ready for an ensuing operating excursion in unison with the belt.

It should be pointed out that the second sub-frame B is moved in unison with the sub-frame A. For convenience, this may be done by a positive actuating connection between the two sub-frames. Referring to the sub-frame B, it is shown as substantially like sub-frame A, having side frame members 75, a top plate 76 and one or more cross members or supports 77. The side frame members 75 carry rollers 78 penetrating and riding along the channel tracks 24. The frames are shown as connected by rods 80, the result being that a single actuating means may be employed to move the frames A and B in unison. The frame B carries a piston structure which is substantially identical with that shown in connection with sub-frame A and which need not be separately described. It will be noted, however, that the piston rod 36a carries a plate 80 which supports a pad 81 which may be of somewhat different shape than the pads 43, 44, and which need not have any liquid supply means. It will be understood, however, that in proper timed relation with the movement of the belt, the pads 81 are moved downwardly toward the work by the application of pressure along the ducts 70a. If desired, a single pressure system may include both sets of pistons, whereby the pressure pads of both sub-frames move downwardly and upwardly in unison.

The means for moving the two sub-frames A and B will now be described. A chain 85 passes about a drive sprocket 86 and an idler sprocket 87. The drive sprocket 86 is suitably driven as by a belt or chain 88 which may pass about any suitable sprocket 89, shown as mounted on or moving unitarily with the pinion 10. I find it desirable to use the chain 85 as a returning means and, therefore, I so arrange the drive that the upper length of the chain 85 moves in a direction opposite to the direction of movement of the upper length of the main chain, and at a speed which may be of the order of 4 times as great.

In order to impart to the sub-frames A and B a movement in unison with the upper stretch of the main chain, I provide an intermittent connection between the sub-frame A and the main chain, which is shown in some detail, for example, in Figs. 3 and 4. With reference first to Fig. 3 I illustrate a rotatably mounted shaft 100 which passes through the side plate 27 which carries a support 101 for two micro-switches 102, 103. Each micro-switch is provided with a pawl or dog 104 which is adapted to be engaged by lugs 105 on the support carrying chain plates 15. The lug 105 is positioned on each of the chain plates upon which the supports 19 are mounted. It will be understood that when the parts are in the position in which they are shown in Figs. 4 and 5, the lugs 105 engage the dogs or pawls 104 and move with sub-frame A in unison with the upper length of the main conveying chain. It will be understood that the micro-switches 102, 103 may be employed to close or open any suitable circuits, not herein shown, for actuating and controlling the fluid system by which fluid under pressure is admitted to the various cylinders 32 through the pressure inlets or ducts 70. Thus, the support 101 performs the double function in positioning the micro-switches 102 and 103 in suitable actuating position while holding the pawls or dogs 104 in the proper position to maintain the desired movement of the sub-frame A in unison with the conveying surface of the belt. The circuit is so arranged that the various operating pads 43, 44 on the sub-frame A and pads 81 on the sub-frame B move downwardly against the work while the work and the sub-frame are moving in unison and withdraw upwardly away from the work, before the sub-frames A and B are given a differential movement in relation to the conveying chain. In the meanwhile, there is no conveying action between the sub-frame A and the belt 85. There is, however, an actuating or timing connection between the sub-frame A and the chain 85 as follows: Mounted on the side wall 27 of the sub-frame A is a stub shaft 110 which rotatably carries a sprocket 111 in mesh with the chain 85. It also carries a ratchet wheel 112, the sprocket and the ratchet wheel being mounted for unitary rotation about the sub-shaft 110, thus when the sub-frame A is moving in unison with the main conveyor chain the sprocket 111 is rotated by its connection with the chain 85 and it thereby rotates the ratchet wheel 112. When the parts are in the full line position of Fig. 4 the ratchet wheel 112 does no work. Secured to the shaft 100 and moving unitarily with it is a lever generally indicated as 114 having an upper end and a lower end. The lower end is opposed to a suitable adjustable stop 115 mounted on or fixed in relation to the track 23, when the sub-frame A has completed its retrograde excursion. The result is to move a dog 116, pivoted at 117 on the side plate 27 of the sub-frame A, from the dotted line to the full line position of Fig. 4. The parts are held in the position in which they are shown by any suitable retainer lever 118 pivoted as at 119 downwardly thrust by the spring 120 and provided with a roller 121 which engages one side or the other of the upper edge of the lever 114. 122 is a limiting slot in the lever 114 which receives a limit pin 123 mounted on the side plate 27. The parts, when in the full line position of Fig. 4, are arranged for a unitary movement of the sub-frame A, in the direction of the full lined arrow. The member 112 is idling, and there is no actuating or direct driving connection between the sub-frame A and the chain 85. Assume, however, that the sub-frame A moves in the direction of the full line arrow until the above described parts are moved from the full line to the dotted line position. The lower end of the lever 114 then engages an opposite stop 130 mounted on the track 23 and the lever 114 is thereby moved into the dotted line position in which it is shown at the left of Fig. 4. In the first place, this lifts the support 101 and thus removes the dog 104 from its driving connection with one of the lugs 105. This brakes the driving connection between the sub-frame A and the conveying chain. At the same time, the link 131 moves the dog 116 to its dotted line position, in which it is in engagement with the ratchet wheel 112. This locks the ratchet wheel in position and thus locks the sprocket 111. The sprocket then becomes a positive connection between the sub-frame A and the chain 85 and the chain 85 moves the sub-frame A and with it the sub-frame B in the direction of the dotted arrow until the lever 114 again engages the fixed stop 115 and permits the sub-frame A again to move in unison with the conveyor chain.

To summarize, the two sub-frames move in unison with the upper length of the conveyor chain for a period long enough to permit the pistons to move the pads 43, 44 of sub-frame A and 81 of sub-frame B downwardly against the pairs of articles which are centered on the particular supports 19 which underlie the sub-frames. The support 101, and the lever 114, perform the dual function of maintaining a driving connection between the conveyor chain and the sub-frame and of moving the micro-switches 102, 103, to the proper position to control the circuits which, in turn, control the admission of pressure to the cylinders 32. The parts are so proportioned that by the time the pads have gone through their operative excursions and have upwardly withdrawn, the lever 114, at its lower end, engages the fixed stop 130, which disconnects the sub-frame A, and thus the sub-frame B, from the conveyor chain, and connects them to the chain 85 which returns them in time to operate on the next ensuing pair of work pieces.

It will be realized that whereas I have described and shown a practical and operative device, nevertheless, many changes may be made in size, shape, number and disposition of parts without departing from the support of my invention. I, therefore, wish my description and drawings to be taken as in a broad sense illustrative and diagrammatic rather than as limiting me to my precise showing.

For example, that it may be desirable partly to dry whatever liquid or adhesive is applied by the pads on the sub-frame A. I illustrate, for example, in Figs. 1 and 2 any suitable air spray or drying device indicated at 140 in Figs. 1 and 2.

I have not illustrated in detail the electrical circuits employed. I may provide any suitable relay housing 141, in which many suitable relays, not herein shown, may be housed. It will be understood that I do not wish to be limited to any specific relays or circuits and hence do not illustrate any in detail.

The use and operation of my invention are as follows:

I illustrate a china treating device in which the main conveyor chain, herein shown as formed of pivoted plates 15, is positively driven from any suitable power source. Upon this chain, any suitable means, mechanical or manual, may be employed to position the work in properly centered position upon the supports 19. In practice, it may be advantageous to have an operator stand at the feed end of the chain, at the right end, referring to the position of the parts as shown in Figs. 1 and 2. The operator may manually position and center the work upon the appropriate supports 19. The above described actuating connection moves the sub-frames A and B first with the belt, and then in a direction opposite to the movement of the upper conveying length of the belt. While the sub-frames are moving with the belt, the micro-switches 102 and 103 may be used to control pressure and to move the pads on the two sub-frames downwardly against and then upwardly away from the work. Thereafter a contact between the lever 114 and the member 130 breaks the driving connection between the sub-frame A and the main conveyor belt and closes the connection between the sub-frame A and the reversing belt 85. Since no work is done on the china during this retrograde movement, it is advantageous to move the belt 85 much more rapidly than the lower belt is moved. This movement is also advantageous in order that sub-frames A and B may return in time to operate on the next following pair of units.

It will be understood that I do not wish to be limited to the use of any particular liquid or pigment. I may apply gold leaf or I may apply any suitable coloring matter. I may apply an adhesive liquid or I may apply merely water. I may use the air spray or drier 140 or omit it, but depending on the needs of the particular material employed.

In the typical use of my invention, as shown in the drawings, I may consider the device as having five stations. I will describe them as follows:

(a) The intake station, formed by the clear stretch of belt at the right-hand end of the belt, referring to the position of the parts in Fig. 1. At this station, the operator may manually position the work on the centering supports.

(b) The sizing station, in which a suitable sizing or adhesive is applied to the work by the piston mechanisms on the initial sub-frame.

(c) An intermediate station, where an operator may apply decals or gold foil or other suitable material to the work.

(d) The rubbing or finishing station, where the second set of pads operates against the work.

(e) The take-off or removal station, where an operator may remove the work, or suitable work removing means may be positioned.

It will, of course, be understood that I may employ any desired materials, as well as size, and that my mechanism may be employed to carry out a wide variety of treatments.

I claim:

1. In a mechanism for applying pigment and the like, a conveyor belt adapted to receive the articles to be treated, means for actuating it, a sub-frame overlying said conveyor belt, means for moving said sub-frame in unison with the work-supporting portion of said conveyor belt for a predetermined distance, including a driving connection between the conveyor belt and the sub-frame, whereby, when such connection is in operative position, movement of the conveyor belt is effective to move the sub-frame in unison with the conveyor belt, means for returning said sub-frame in an opposite direction after it has moved a predetermined distance with said belt and means on said sub-frame for engaging and operating on the work while the sub-frame is moving with the belt.

2. In a marking device for china, and the like, a base, a conveyor belt, mounted on said base, and having a laterally extending conveying length adapted to receive and convey articles to be removed, driving mechanism for said belt, means for centering the articles to be removed at predetermined points along said belt, a movable sub-frame having a portion overlying the laterally extending conveying stretch of said belt, an intermittently operable driving connection between said sub-frame and said belt, adapted to move said sub-frame with said belt, an operating assembly on said sub-frame, including an article marking member mounted for movement into and out of contact with the articles on said belt, and means for returning the sub-frame to an initial position, after a predetermined movement of the sub-frame with the belt and after the articles on the belt have been contacted by said member on the sub-frame, in readiness for an ensuing movement with the belt.

3. The structure of claim 2, characterized by and including a conveyor belt consisting of a plurality of articulated plates.

4. The structure of claim 2, characterized by and including a conveyor belt consisting of a plurality of articulated plates, and a centering work support on each alternate plate.

5. The structure of claim 2, characterized by and including a sub-frame divided into two separate portions spaced along the belt, and an operating assembly on each sub-frame, including a member mounted for movement into and out of contact with articles on the belt below each such sub-frame.

6. The structure of claim 2, characterized by and including a switch assembly for said operating assembly on the sub-frame, said switch assembly having an element adapted to maintain a driving connection between the sub-frame and the belt.

7. The structure of claim 2, characterized by and including a switch assembly mounted on the sub-frame for said operating assembly, said switch assembly having an element adapted to maintain a driving connection between the sub-frame and the belt, and abutment means on said base adapted to move said switch assembly into and out of locking relationship with the belt, at the beginning and at the end, respectively, of a predetermined operating excursion of the sub-frame.

8. The structure of claim 2 characterized by and including a mechanism for returning the sub-frame to its initial position at a rate of speed substantially greater than the rate of linear speed of its movement with the belt.

9. The structure of claim 2 characterized by and including a constantly operated return belt and means for connecting said sub-frame to said return belt at the end of its movement with said conveyor belt.

10. The structure of claim 2 characterized by and including a track on said base, along which said sub-frame is movable.

11. The structure of claim 2 characterized in that the operating assembly comprises a cylinder on said sub-frame, and a piston in said cylinder, a work engaging, article marking member on said piston, and a pressure system for said piston and cylinder, adapted to move the article-marking member thus formed toward and away from the work.

FRED BARON.

REFERENCES CITED

The following references are of record in the file of this patent:

UNITED STATES PATENTS

| Number | Name | Date |
|---|---|---|
| 1,959,711 | Flint et al. | May 22, 1934 |
| 2,208,636 | Johnson | July 23, 1940 |
| 2,358,258 | Schweitzer | Sept. 12, 1944 |
| 2,450,438 | Miller | Oct. 5, 1948 |
| 2,479,663 | Andrew et al. | Aug. 23, 1949 |